United States Patent [19]

Ishizeki

[11] Patent Number: 5,307,021
[45] Date of Patent: Apr. 26, 1994

[54] PHASE-ERROR DETECTING CIRCUIT FOR QDPSK DEMODULATOR

[75] Inventor: Yoshiaki Ishizeki, Kanagawa, Japan

[73] Assignee: NEC Corporation, Tokyo, Japan

[21] Appl. No.: 946,171

[22] Filed: Sep. 17, 1992

[30] Foreign Application Priority Data

Sep. 19, 1991 [JP]  Japan .................................. 3-268416

[51] Int. Cl.$^5$ ........................ H03D 3/00; H04L 27/22
[52] U.S. Cl. .................................. 329/308; 329/305;
375/81; 375/85; 375/120
[58] Field of Search ....................... 329/304, 305, 308;
375/81, 84, 85, 120; 455/205, 208, 337

[56] References Cited

U.S. PATENT DOCUMENTS 4,592,075  5/1986  Tsukamoto ..................... 329/307 X
4,856,027  8/1989  Nakamura et al. ............. 329/308 X

OTHER PUBLICATIONS

"Principle of Operation of IC μPC1478C adapted for QDPSK Demodulation in a Receiver for Satellite Broadcasting", Catalogue No. MA-102B, Dec. 1989, pp. 917 through 924, issued by NEC Corp. (no month/yr).

Primary Examiner—David Mis
Attorney, Agent, or Firm—Leydig, Voit & Mayer

[57] ABSTRACT

A phase-error detecting circuit for detecting a phase error of an output signal of the VCO in a QDPSK demodulating circuit in accordance with the Costas loop method is disclosed. The phase-error detecting circuit comprises a first circuit which generates a first product (P×Q) of a first demodulated signal (P) and a second demodulated signal (Q) of a QPSK signal. A second circuit generates the difference of the squares ($P^2-Q^2$) of the first and second demodulated signals. A third circuit receives both the first product (P·Q) generated by the first circuit and the difference ($P^2-Q^2$) generated by the second circuit and generates the product of the first product (P·Q) and the difference ($P^2-Q^2$). The first circuit includes a first quadratic multiplier for generating the first product. The second circuit includes second and third quadratic multipliers, a phase-reversing mechanism for reversing the phase of the signal (Q), and an adding mechanism. The second quadratic multiplier generates the square of the first signal ($P^2$). The third quadratic multiplier multiplies the second signal and the phase-reversed second signal generating ($-Q^2$). The adding mechanism adds ($P^2$) and ($-Q^2$).

4 Claims, 6 Drawing Sheets

PHASE-ERROR DETECTING CIRCUIT FOR QDPSK DEMODULATOR

BACKGROUND OF THE INVENTION

1. Field of the Invention

The present invention relates to a QDPSK (Quad Differential Phase Shift Keying) demodulating circuit in accordance with the Costas loop method, and in particular to an improvement in a phase-error detecting circuit for a demodulating circuit.

2. Description of the Related Art

QDPSK is a formality of phase modulation in which the instantaneous phase of the subcarrier is shifted by 0, 90°, 180° or 270° corresponding to the 2 bit PCM code. Data transmission in accordance with the QDPSK, as is commonly known, has the advantage that demodulation can be effected without knowing the absolute phase of the standard-phase signal generated in the transmitter end. This causes, however, the necessity to regenerate the standard-phase signal in the receiver end. The Costas loop method provides a useful tool for regenerating the standard-phase signal.

A brief explanation will be given below on the Costas loop method with reference to the technical paper entitled "Principle of Operation of IC. μPC1478C adapted for QDPSK Demodulation in a Receiver for Satellite Broadcasting" on pages 917 through 924 of Data Book, Catalogue Number MA-102B, issued by NEC CORP. in December 1989.

FIG. 1 shows a schematic diagram of a QDPSK demodulating circuit. The demodulating circuit is made up of phase demodulators 12 and 14, phase-error detecting circuit 16, low-pass filter (LPF) 18, voltage-controlled oscillator (VCO) 19 and phase shifter 20. QPSK signal S is supplied to phase demodulators 12 and 14 through input terminals 11. Each of phase demodulators 12 and 14 is provided with a multiplier and an LPF. The multiplier generates the product of signal S and regeneration signal $L_P$ or $L_Q$, where regeneration signal $L_P$ is fed from VCO 19 directly to phase demodulator 12 and regeneration signal $L_Q$ is fed through $\pi/4$ phase shifter 20 to phase demodulator 14. The LPF cuts off the high frequency component contained in the product signal, thus delivering demodulated signal P or Q.

Now, if $$S = E\cos(\omega t + \theta) \quad (1)$$

$$L_P = E_1 \sin(\omega t + \theta_1) \quad (2)$$

and $$L_Q = E_1 \cos(\omega t + \theta_1), \quad (3)$$

where $\theta$ takes values $2n\pi/4$ (n=0, 1, 2, ...) corresponding to the PCM code to be transmitted, the standard-phase signal being $E\cos \omega t$, then it follows that $$S \times L_P = 2^{-1} EE_1 \{\cos(2\omega t + \theta + \theta_1) \sin(\theta_1 - \theta)\}. \quad (4)$$

Since the first term on the right side of equation (4) is cut off by the LPF in phase demodulator 12, it follows that $$P = 2^{-1} EE_1 \sin(\theta - \theta_1). \quad (5)$$

Similarly, $$Q = 2^{-1} EE_1 \cos(\theta - \theta_1). \quad (6)$$

Phase-error detecting circuit 16, receiving demodulated signals P and Q, computes $(P^2 - Q^2) PQ$ and delivers the computation as phase error signal R. For this end, phase-error detecting circuit 16 is provided with multiplying circuit 161 to produce $P \times Q$, adding circuit 162 to produce $P+Q$, subtracting circuit 163 to produce $P-Q$, multiplying circuit 164 to produce $P^2 - Q^2$ from the outputs of adding and subtracting circuits 162, 163 and multiplying circuit 165 to produce $R = (P^2 - Q^2) PQ$ from the outputs of multiplying circuits 161 and 164.

It follows from equations (5) and (6) that $$\begin{aligned} R &= (P^2 - Q^2)PQ \\ &= -(64)^{-1}(EE_1)\sin 4(\theta - \theta_1). \end{aligned} \quad (7)$$

Accordingly, if $\theta - \theta_i$ takes any value of $n\pi/4$ (n=0, 1, 2, ...), then the QDPSK demodulating circuit is phase-locked. Conversely, if the ODPSK demodulating circuit is phase-locked for any input QPSK signal S, the QPSK signal is a signal which has a phase shifted by $n\pi/4$ radian with respect to a phase of the signal generated by VCO 19. Accordingly, the output signal of VCO 19 will be coherent, or phase-synchronized with the standard-phase signal when the QDPSK demodulating circuit is phase-locked. In this way, the standard-phase signal is regenerated in the receiver end.

The above is an outline of a QDPSK demodulating circuit according to the Costas loop method. FIG. 2 shows a typical phase-error detecting circuit of the prior art, and FIG. 3 shows a block diagram of the quartic multiplier shown in FIG. 2.

The phase-error detecting circuit of FIG. 2 consists of two parts. The first part is a biquadratic multiplier made up of serially connected four-stage differential amplifiers. Hereafter, a differential amplifier made up of transistors Q1, Q2 is referred to as differential amplifier (Q1, Q2), and a differential amplifier made up of double differential amplifiers (Q1, Q2) and (Q3, Q4) is referred to as differential amplifier (Q1, Q2; Q3, Q4). The 1st stage differential amplifier (Q11, Q12) supplied with demodulated signal P and constant voltage V1 generates an output current signal proportional to P-V1. Hereafter the current signal proportional to P-V1 is referred to as current signal P. Current signal P drives the emitters of 2nd stage differential amplifier (Q13, Q14; Q15, Q16). Since differential amplifier (Q13, Q14; Q15, Q16) is supplied with demodulated signal Q and constant voltage V2, the cross-coupled collectors of differential amplifier (Q13, Q14; Q15, Q16) carries an output current signal proportional to (P-V1)(Q-V2). Hereafter the current signal proportional to Q-V2 is referred to as current signal Q. Thus, serially connected two-stage differential amplifiers (Q11, Q12) and (Q13, Q14; Q15, Q16) constitute multiplying circuit 161 shown in FIGS. 1 and 3, which provides current output $P \times Q$. This type of multiplier will be referred to as the multiplication demodulator type, because it is often used to demodulate a double-balanced modulated signal. Differential amplifier (Q17, Q18; Q19, Q20), receiving signals $P_1$ and $Q_1$, provides an output current signal proportional to $P_1 - Q_1$. Signals $P_1$, $Q_1$ are, as will be described below, produced by shifting the voltage levels of demodulated signals P, Q, respectively, by the same amount, and further by reversing the phase of signal $Q_1$. Thus $P_1-Q_1=P+Q$. Accordingly, differential amplifier (Q17, Q18; Q19, Q20) corresponds to adding circuit 162 shown in FIGS. 1 and 3. Similarly, differential amplifier (Q21, Q22; Q23, Q24), receiving signals $P_2$ and $Q_2$, provides an output current signal proportional to $P^2-Q^2$. Since signals $P_2$, $Q_2$ are also provided by shifting demodulated signals P, Q by the same amount, $P^2-Q^2 = P-Q$. Thus differential amplifier (Q21, Q22; Q23, Q24) corresponds to subtracting circuit 163 shown in FIGS. 1 and 3. The connection between the cross-coupled collectors of differential amplifier (Q17, Q18; Q19, Q20) and the coupled emitters of differential amplifier (Q21, Q22; Q23, Q24) constructs a quadratic multiplier for $(P+Q)(P-Q)$. Thus this connection corresponds to multiplying circuit 164 shown in FIG. 1 and to multiplying operator 164 shown in FIG. 3. Similarly, the connection between differential amplifiers (Q13, Q14; Q15, Q16) and (Q17, Q18; Q19, Q20) corresponds to multiplying circuit 165 shown in FIG. 1 and to multiplying operator 165 shown in FIG. 3. In this way, serially connected four-stage differential amplifiers (Q11, Q12), (Q13, Q14; Q15, Q16), (Q17, Q18; Q19, Q20) and (Q21, Q22; Q23, Q24) constitute a biquadratic multiplier for computing $P\times Q\times(P+Q)\times(P-Q)$.

The second part of the phase-error detecting circuit shown in FIG. 2 is made up of level-shifting circuits for shifting voltage levels of demodulated signals P, Q to the levels necessary to drive the bases of the differential amplifier arranged in each stage of the biquadratic multiplier. Differential amplifier (Q1, Q2) with load transistor Q7 is directed to shifting the voltage level of demodulated signal P to provide the base operating voltage for differential amplifier (Q17, Q18; Q19, Q20). This level-shifting circuit provides signal $P_1$ in phase with demodulated signal P. Differential amplifier (Q5, Q6) with load transistor Q8 is directed to shifting the voltage level of demodulated signal Q to provide the base operating voltage for differential amplifier (Q17, Q18; Q19, Q20). This level-shifting circuit provides signal $Q_1$ in reverse phase to demodulating signal Q. In order to ensure the same voltage shift, load transistors Q7 and Q8 are applied with the same base potential. Similarly, differential amplifier (Q3, Q4) with load transistor Q9, and differential amplifier (Q5, Q6) with load transistor Q10 provide base operating voltage signals $P_2$, $Q_2$ for differential amplifier (Q21, Q22; Q23, Q24), both signals $P_2$ and $Q_2$ being in phase with demodulated signals P, Q, respectively. A computation carried out by the biquadratic multiplier is supplied to the bases of transistors Q25, Q26 in order to be level-shifted and supplied to VCO 19 through LPF 18 (c.f. FIG. 1).

A problem encountered in the phase-error detecting circuit described above is that, since the biquadratic multiplier made up of serially connected four-stage differential amplifiers is used for computing phase error R, it is difficult to use such a phase-error detecting circuit in an IC fabricated by the silicon processing normally operated by a low-voltage power source such as 5 volts, because such a low-voltage power source is incapable of supplying a sufficient operating voltage to all the stages of the serially connected differential amplifiers. As a result, the QDPSK demodulating circuit according to the Costas loop method has been difficult to operate together with peripheral circuits under a single low-voltage power source, which is at variance with recent growing demand both for the PSK transmission of digitalized informations and for making devices small-sized and portable.

SUMMARY OF THE INVENTION

It is an object of the present invention to provide a phase-error detecting circuit operable by a low-voltage power source in common with peripheral circuit and preferable operable by battery.

It is another object of the present invention to provide a QDPSK demodulating circuit in accordance with the Costas loop method provided with a phase-error detecting circuit operable by a power source in common with other circuits arranged in the QDPSK demodulating circuit.

Accordingly, the present invention includes a phase-error detecting circuit for detecting a phase error of an output signal of a VCO in a QDPSK demodulating circuit in accordance with the Costas loop method. The phase-error detecting circuit includes first, second, and third means. The first means generates a first product $(P\times Q)$ of a first signal (P) and a second signal (Q). The first and second signals are generated by phase demodulating a QPSK signal. The second means generates the difference of the squares $(P^2-Q^2)$ of the first and second signals. The third means receives both the first product generated by the first means and the difference generated by the second means and generates a second product $((PQ)\times(P^2-Q^2))$ of the first product and the difference. The first means includes first quadratic multiplier means for generating the first product. The second means includes second quadratic multiplier means, phase reversing means for reversing the phase of the second signal (Q), third quadratic multiplier means, and adding means. The second quadratic multiplier means receives the first signal (P) and generates the square $(P^2)$ of the first signal. The third quadratic multiplier means receives the second signal (Q) and a phase-reversed second signal $(-Q)$ with the phase reversed by the phase reversing means. The third quadratic multiplier means generates the product $(-Q^2)$ of the second signal and the phase-reversed second signal. The adding means adds the square $(P^2)$ of the first signal and the product of the second signal and the phase-reversed second signal.

The above and other objects, features and advantages of the present invention will become apparent from the following description based on the accompanying drawings which illustrate an example of a preferred embodiment of the present invention.

DETAILED DESCRIPTION OF PREFERRED EMBODIMENT

Figure 1:
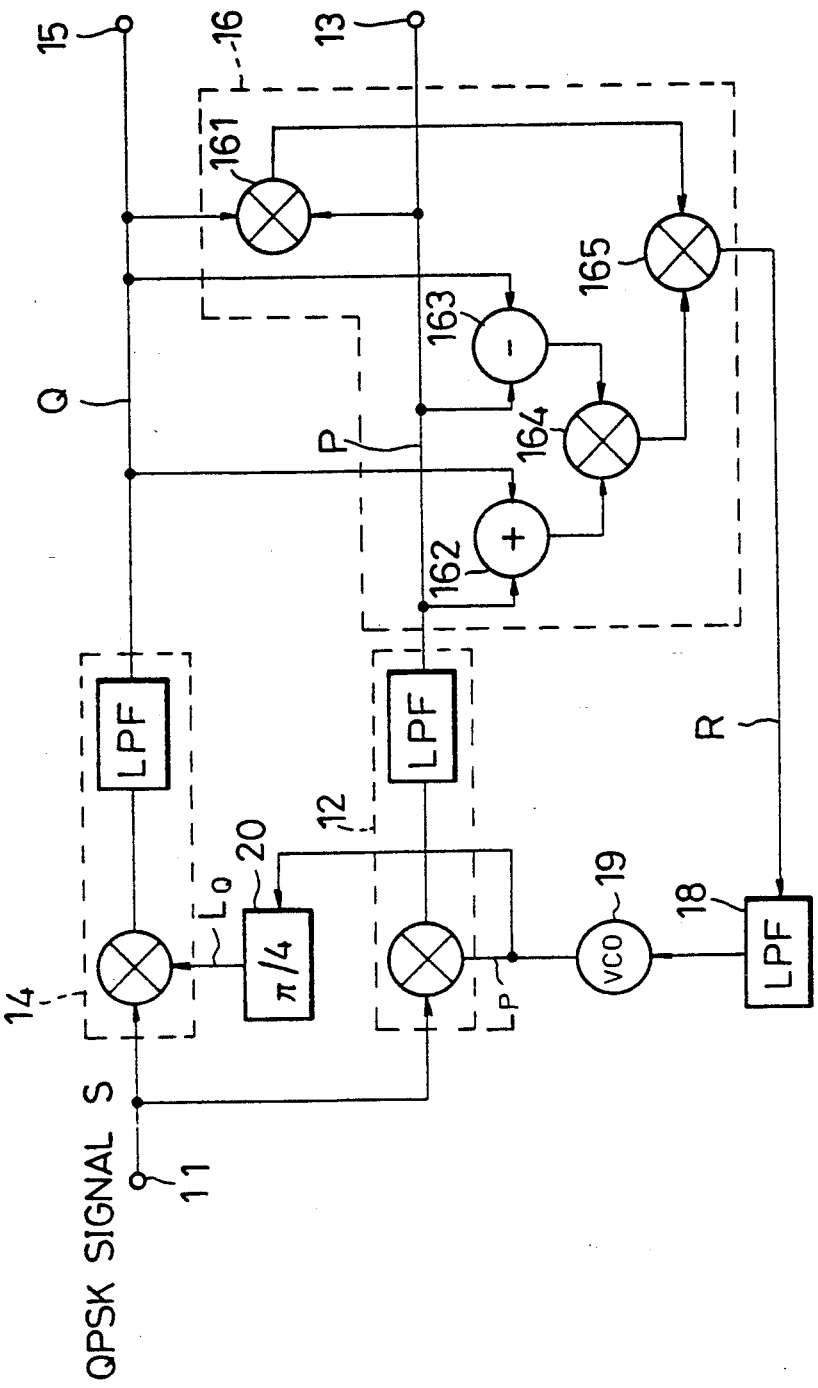
FIG. 1 shows a schematic diagram of a QDPSK demodulating circuit.
Figure 2:
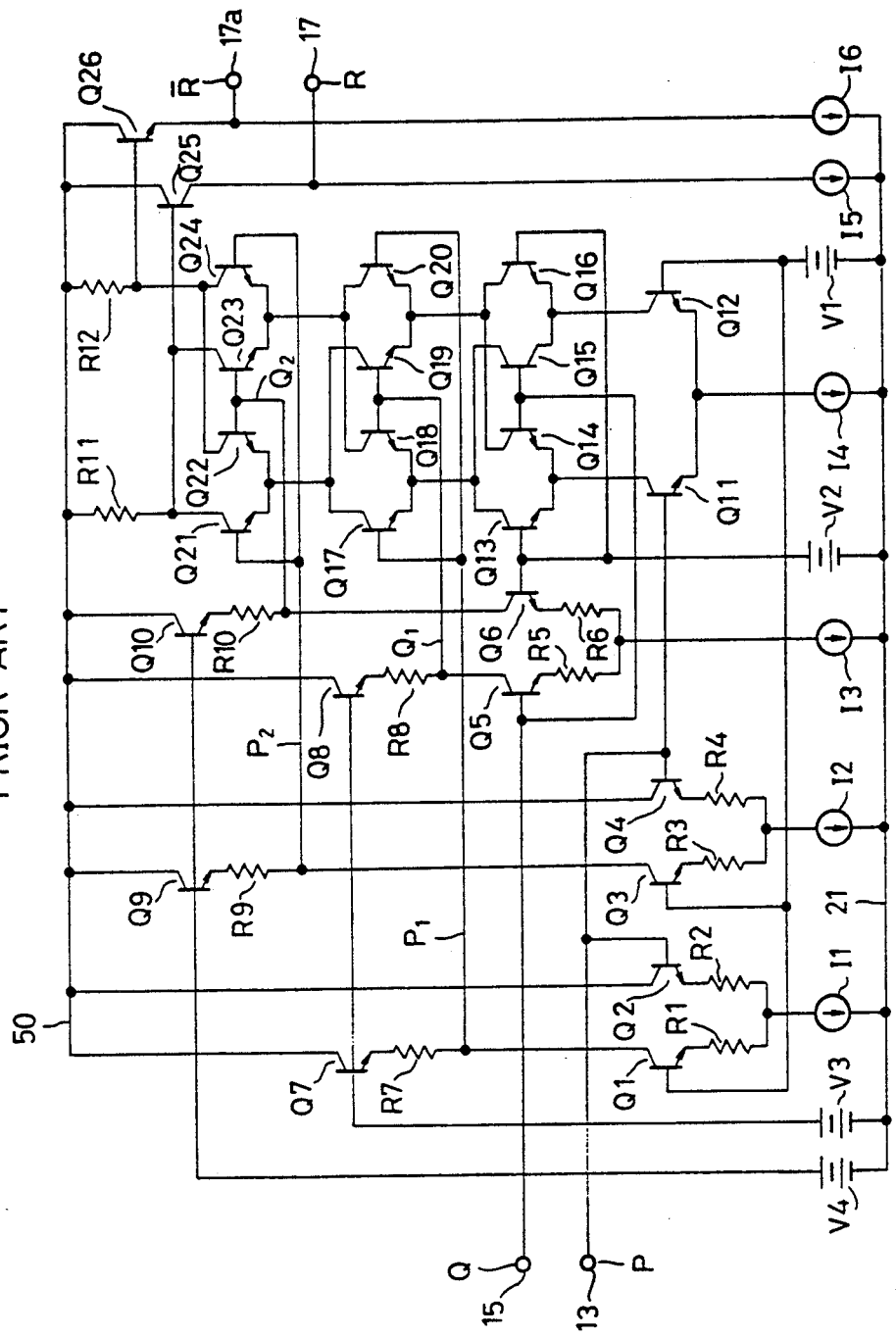
FIG. 2 shows a typical phase-error detecting circuit of the prior art.
Figure 3:
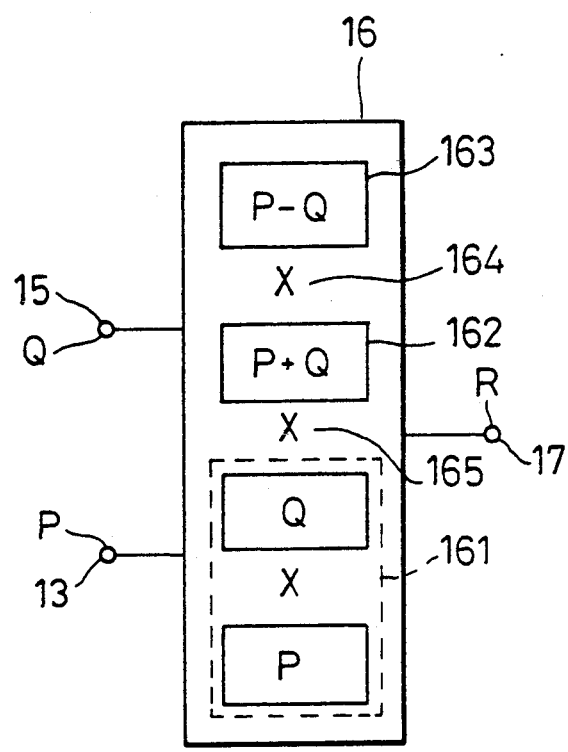
FIG. 3 shows a block diagram of the quartic multiplier shown in FIG. 2.
Figure 4:
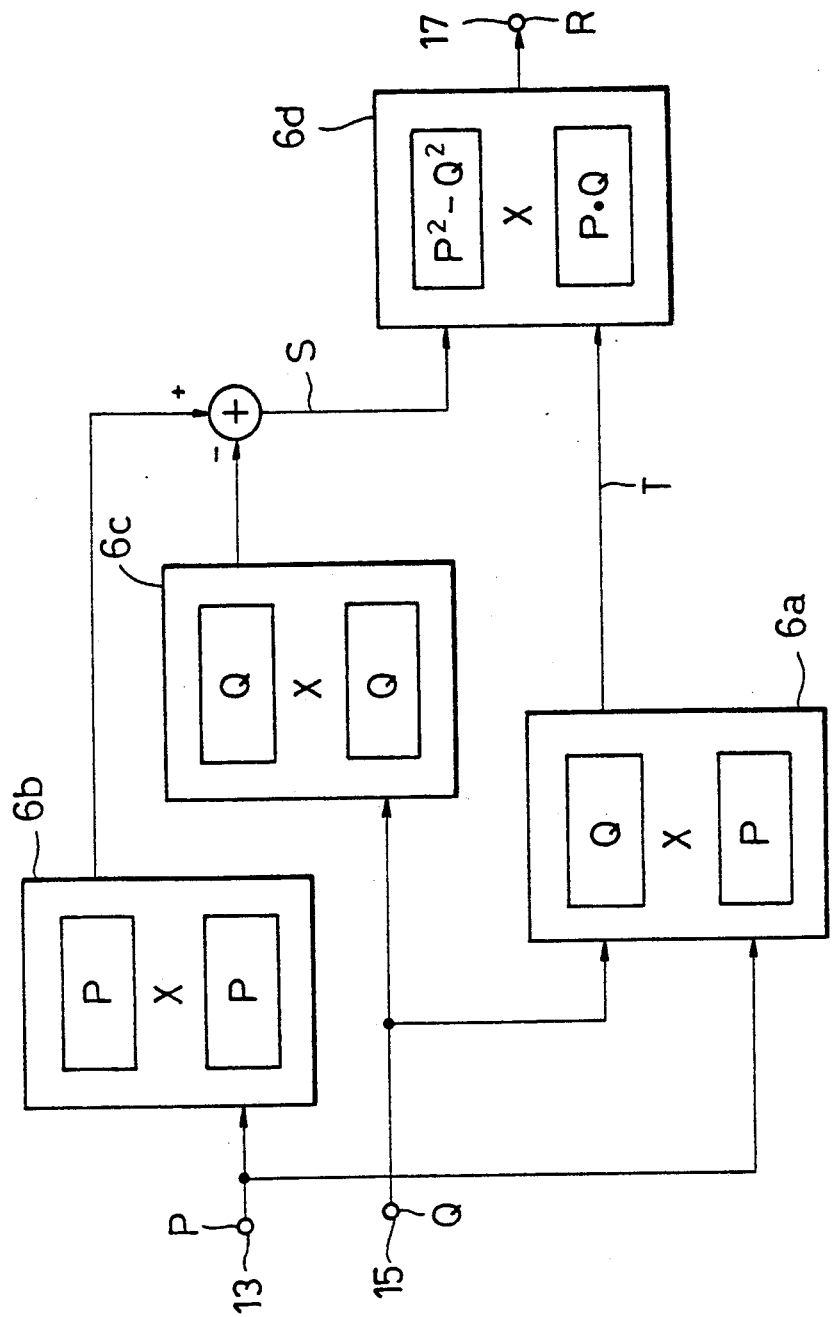
FIG. 4 shows a block diagram of the phase-error detecting circuit according to the present invention.
Figure 5:
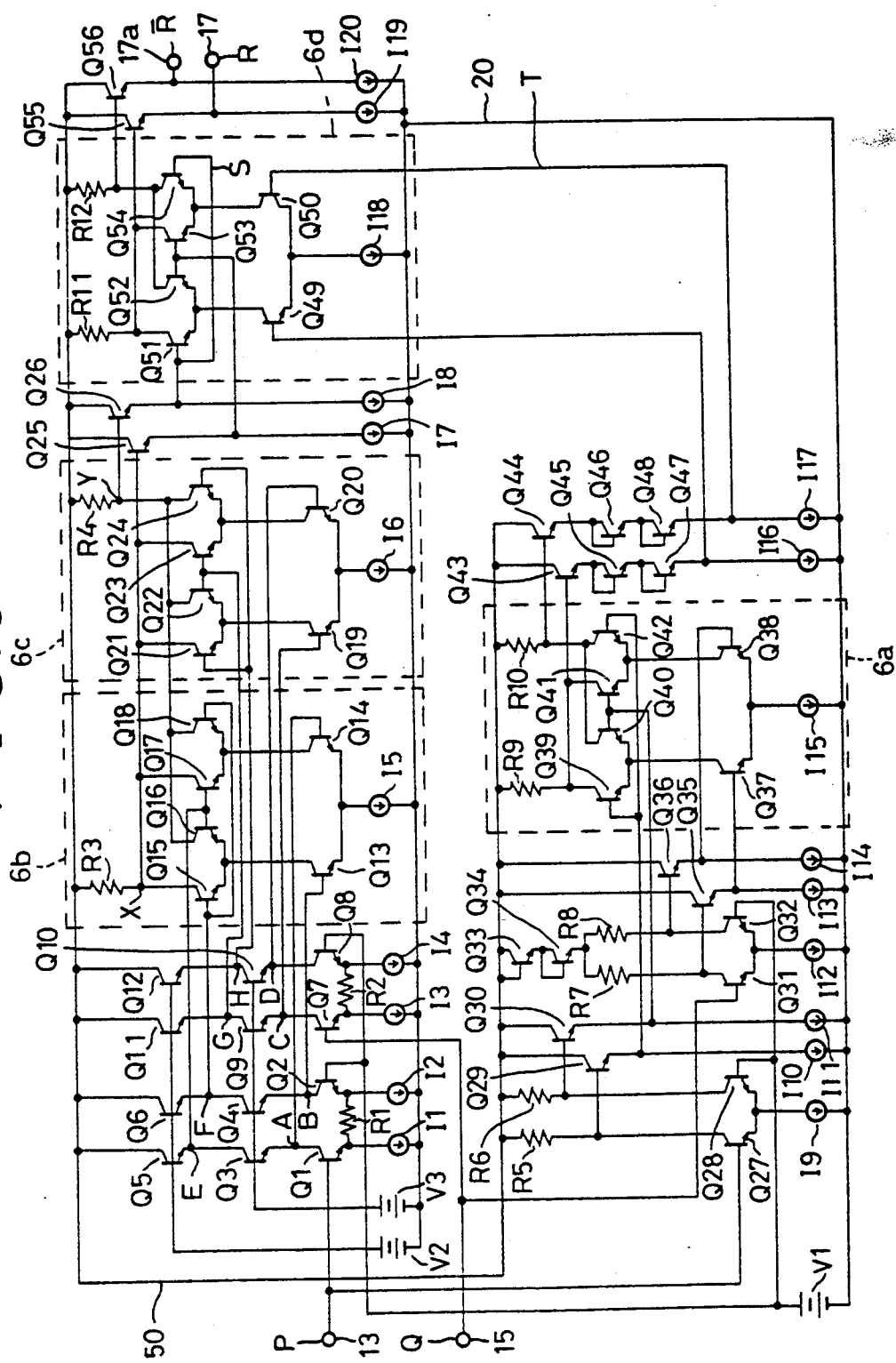
FIG. 5 shows the phase-error detecting circuit according to the present invention.
Figure 6:
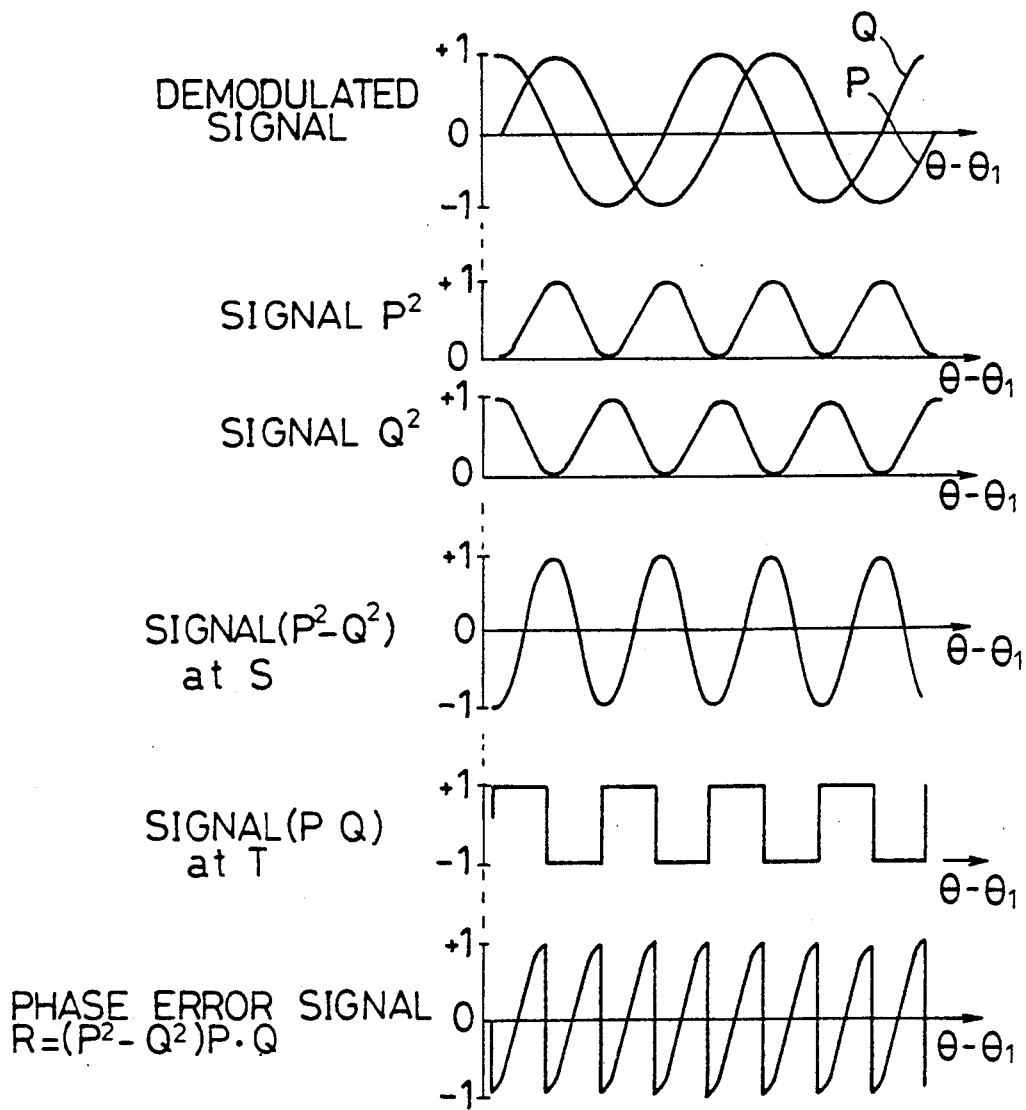
FIG. 6 shows signals at various points in the circuit shown in FIG. 5 plotted against $\theta-\theta_1$.

Referring now to FIGS. 4, 5 and 6, the phase-error detecting circuit of the present invention will be illustrated below. The essential part of the phase-error detecting circuit is made up of quadratic multipliers 6a, shown in FIG. 4. Multipliers 6a, 6b and 6c provide voltage signals corresponding to P×Q, P×P and Q×Q, respectively. The output currents of multipliers 6b and 6c are, as will be described below, superposed so as to generate a square difference signal proportional to $P^2-Q^2$. Multiplier 6d receives the output of multiplier 6a and square difference signal $P^2-Q^2$ and provides phase error signal R which equals $(P^2-Q^2)PQ$.

In FIG. 5, differential amplifier (Q27, Q28) of the ECL type, an emitter follower Q29 made up of transistor 29 with the emitter connected to constant current supply I10 and emitter follower Q30 made up of transistor Q30 with the emitter connected to constant current supply I11 constitute a level-shifting circuit. The level-shifting circuit shifts the voltage level of demodulated signal P and provides an appropriate voltage level for operating the bases of differential amplifier (Q39, Q40; Q41, Q42).

Similarly, differential amplifier (Q31, Q32) of the ECL type, emitter follower Q35 and emitter follower Q36 constitute a level-shifting circuit which shifts the voltage level of demodulated signal Q to provide an appropriate base operating voltage for differential amplifier (Q37, Q38). Since the bases of differential amplifier (Q27, Q28) are supplied with demodulated signal P and constant voltage V1, and since the bases of differential amplifier (Q31, Q32) are supplied with demodulated signal Q and constant voltage V1, quadratic multiplier 6a provides an output voltage signal proportional to (P-V1)(Q-V1) Since P-V1, Q-V1 represent the values of demodulated signals P and Q, respectively, measured from voltage standard V1, P-V1, Q-V1 will be referred to below as P, Q, respectively. Thus quadratic multiplier 6a provides an output of P·Q. Since differential amplifiers (Q27, Q28) and (Q31, Q32) are of the ECL type, as described above, the output signal of quadratic multiplier 6a behaves as a square wave representing signs + and - alternately at twice the frequency of demodulated signal P, as seen in FIG. 6. This square wave will be referred to as a sign signal. The reason why the sign signal is provided will be described below.

Differential amplifier (Q1, Q2), load transistors Q3, Q5 for gain transistor Q1 and load transistors Q4, Q6 for gain transistor Q2 constitute a level-shifting circuit for demodulated signal P and constant voltage V1. The output voltage signal across junctions A, B is supplied to differential amplifier (Q14, Q13) in quadratic multiplier 6b in such a way that the potentials at junctions A, B are applied to the bases of transistors Q14, Q13, respectively. Similarly, the output voltage signal across junction, E, F is supplied to differential amplifier (Q16, Q15; Q17, Q18). Thus, the cross-connected collectors of differential amplifier (Q16, Q15; Q17, Q18) carry a current signal proportional to $P^2$. Differential amplifier (Q7, Q8), load transistors Q9, Q11 for gain transistor Q7 and load transistors Q10, Q12 for gain transistor Q8 provide a level-shifting circuit. The output voltage signal across junctions D, C is supplied to differential amplifier (Q20, Q19) in quadratic multiplier 6c in such a way that the potentials at junctions C, D are applied to the bases of transistors Q19, Q20, respectively. This way of connection is the reverse of the way of connection between junctions A, B and the bases of transistors Q14, Q13. This reverse connection will be referred to as a reverse-phase connection. Accordingly, when differential amplifier (Q14, Q13) provides output current signal P, differential amplifier (Q20, Q19) provides output current signal-Q. The way of applying the voltage signal across junctions G and H to differential amplifier (Q22, Q21; Q23, Q24) is identical (in phase) with that of applying the voltage signal across junctions E, F to differential amplifier (Q16, Q15; Q17, Q18). Thus the output current signals of quadratic multipliers 6b, 6c are proportional to $P^2$, $-Q^2$, respectively. These current signals are superposed or added in load resistors R3, R4. As a result, the voltage signal across points X and Y is $P^2-Q^2$. Since differential amplifiers (Q1, Q2) and (Q7, Q8) are of low gain, voltage signal $P^2-Q^2$ corresponds to the value calculated from demodulated signals P and Q, as shown in FIG. 6. Voltage signal $P^2-Q^2$ is supplied to the bases of emitter followers Q25, Q26 and level-shifted there. The output signals of emitter followers Q25, Q26 are supplied to differential amplifier (Q52, Q51; Q53, Q54) in quadratic multiplier 6d. Quadratic multiplier 6d multiplies signal P·Q delivered from quadratic multiplier 6a through the level-shifting circuit made up of emitter followers Q43 and Q44 and signal $P^2-Q^2$ supplied to differential amplifier (Q52, Q51; Q53, Q54), and delivers the computation $(P^2-Q^2)P·Q$ from terminals 17a, 17 through the level-shifting circuit made up of emitter followers Q55, Q56.

In the phase-error detecting circuit described above, differential amplifiers (Q1, Q2), (Q7, Q8) are designed so as to have a low gain, while differential amplifiers (Q27, Q28), (Q31, Q32) are designed so as to have a high gain. By virtue of this circuitry, signal P·Q is rapidly saturated with respect to phase difference $\theta-\theta_1$, and takes square-wave form, representing + or − alternately, while signal $P^2-Q^2$ is not saturated and takes sinusoidal-wave form. As a result, phase error signal $R=(P^2-Q^2)P·Q$ has zerocrosses at $\theta-\theta_1=n\pi/4$ ($n=0, 1, ...$), sinusoidally behaves near $\theta-\theta_1=\pi/4, 3\pi/4, 5\pi/4, ...$, and abruptly changes the sign at $\theta-\theta_1=0, 2\pi/4, \pi, ...$, as shown in FIG. 6. This waveform of phase error signal R meets the requirement for effective phase-lock of the QDPSK demodulating circuit. That is why high-gain differential amplifiers (Q27, Q28,) (Q31, Q32) and low-gain differential amplifiers (Q1, Q2), (Q7, Q8) are used.

The phase-error detecting circuit described above is arranged in the QDPSK demodulating circuit provided with a single low-voltage power source.

In the embodiment described above, is $(P^2-Q^2)$ is computed by computing P×P and −Q×Q and adding them. It is also possible, however, to obtain $P^2-Q^2$ by computing $(P+Q)\times(P-Q)$ through a quadratic multiplier. Further, it is possible to compute −Q×Q by connecting the output of differential amplifier (Q7, Q8) in phase with differential amplifier (Q20, Q19), i.e. by connecting the collectors of transistors Q7, Q8 with the bases of transistors Q20, Q19, respectively. It is necessary in this case, however, to connect the collectors of transistors Q21 and Q23 with resistor R4 and also to connect the collectors of transistors Q22 and Q24 with resistor R3.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A phase-error detecting circuit for detecting a phase error of an output signal of a VCO in a ODPSK demodulating circuit in accordance with the Costas loop method, said phase-error detecting circuit comprising:

first means which generates a first product ($P \times Q$) of a first signal (P) and a second signal (Q), said first and second signals being generated through phase demodulation of a OPSK signal;

second means which generates the difference of the squares ($P^2 - Q^2$) of said first and second signals; and third means which receives both said first product generated by said first means and said difference generated by said second means and generates a second product (($PQ) \times (P^2 - Q^2)$) of said first product and said difference wherein said first means includes first quadratic multiplier means for generating said first product and said second means includes second quadratic multiplier means, phase reversing means for reversing the phase of said second signal (Q), third quadratic multiplier means, and adding means, said second quadratic multiplier means receiving said first signal (P) and generating the square ($P^2$) of said first signal, said third quadratic multiplier means receiving said second signal (Q) and a phase-reversed second signal (−Q) with the phase reversed by said phase reversing means and generating the product ($-Q^2$) of said second signal and said phase-reversed second signal, and adding means adding said square ($P^2$) of said first signal and said product of said second signal and said phase-reversed second signal.

2. A phase-error detecting circuit as claimed in claim 1, wherein said third means includes fourth quadratic multiplier for generating said second product, each of said first, second, third and fourth quadratic multiplier means being a quadratic multiplier of the multiplication demodulator type, and said first, second and third means further include level-shifting means for shifting the voltage level of a signal to be supplied to each of said quadratic multipliers so as to match the voltage level necessary to operate the input of said each of said quadratic multipliers.

3. A phase-error detecting circuit as claimed in claim 2, wherein said level-shifting means for said first quadratic multiplier means includes high-gain amplifiers for amplifying said first signal and said second signal, the gain of said high-gain amplifiers being so high that the output signal of said first means becomes square-wave formed representing + and − alternately, and said level-shift means for said second and third quadratic multiplier means includes low-gain amplifiers for amplifying said first signal and said second signal, the gain of said low-gain amplifiers being so low that the output signal of said adding means does not saturate for any possible value of said first signal and said second signal.

4. A QDPSK demodulating circuit in accordance with the quantum loop method comprising:

first phase demodulator means which receives both a QPSK signal and a first regeneration signal and delivers a first signal;

second phase demodulator means which receives both said QPSK signal and a second regeneration signal and delivers a second signal, said second regeneration signal having a phase shifted by $\pi/4$ radian from the phase of said first regeneration signal;

a phase-error detecting circuit for detecting a phase error of an output signal of a VCO in a ODPSK demodulating circuit in accordance with the Costas loop method, said phase-error detecting circuit comprising:

first means which generates a first product ($P \times Q$) of a first signal (P) and a second signal (Q), said first and second signals being generated through phase demodulation of a OPSK signal;

second means which generates the difference of the squares ($P^2 - Q^2$) of said first and second signals;

third means which receives both said first product generated by said first means and said difference generated by said second means and generates a second product (($PQ) \times (P^2 - Q^2)$) of said first product and said difference wherein said first means includes first quadratic multiplier means for generating said first product and said second means includes second quadratic multiplier means, phase reversing means for reversing the phase of said second signal (Q), third quadratic multiplier means, and adding means, said second quadratic multiplier means receiving said first signal (P) and generating the square ($P^2$) of said first signal, said third quadratic multiplier means receiving said second signal (Q) and a phase-reversed second signal (−Q) with the phase reversed by said phase reversing means and generating the product ($-Q^2$) of said second signal and said phase-reversed second signal, and adding means adding said square ($P^2$) of said first signal and said product of said second signal and said phase-reversed second signal wherein said third means includes fourth quadratic multiplier means for generating said second product, each of said first, second, third, and fourth quadratic multiplier means being a quadratic multiplier of the multiplication demodulator type, and said first, second, and third means further include level-shifting means for shifting the voltage level of a signal to be supplied to each of said quadratic multipliers to match the voltage level necessary to operate the input of said each of said quadratic multipliers, and wherein said level-shifting means for said first quadratic multiplier means includes high-gain amplifiers for amplifying said first signal and said second signal, the gain of said high-gain amplifiers being so high that the output signal of said first means becomes square-wave formed representing + and − alternately, and said level-shifting means for said second and third quadratic multiplier means includes low-gain amplifiers for amplifying said first signal and said second signal, the gain of said low-gain amplifiers being so low that the output signal of said adding means does not saturate for any possible value of said first signal and said second signal;

voltage-controlled oscillator means which receives the output of said phase-error detecting means and generates said first regeneration signal; and phase shifter means which shifts the phase of said first regeneration signal by $\pi/4$ radian and delivers the phase-shifted signal as said second regenerated signal.

* * * * *

UNITED STATES PATENT AND TRADEMARK OFFICE
CERTIFICATE OF CORRECTION

PATENT NO. : 5,307,021
DATED : April 26, 1994
INVENTOR(S) : Yoshiaki ISHIZEKI

It is certified that error appears in the above-indentified patent and that said Letters Patent is hereby corrected as shown below:

In Claim 1, column 6, line 67, change "ODPSK" to --QDPSK--;

column 7, line 6, change "OPSK" to --QPSK--.

In Claim 4, column 8, line 4, change "ODPSK" to --QDPSK--;

column 8, line 11, change "OPSK" to --QPSK--.

Signed and Sealed this

Sixteenth Day of August, 1994

Attest:

BRUCE LEHMAN

Attesting Officer     Commissioner of Patents and Trademarks